3,105,825
METHOD OF COMPOUNDING RUBBER
William M. Stratford, New York, N.Y., assignor to Texaco Development Corporation, New York, N.Y., a corporation of Delaware
Filed Sept. 21, 1959, Ser. No. 841,193
5 Claims. (Cl. 260—33.6)

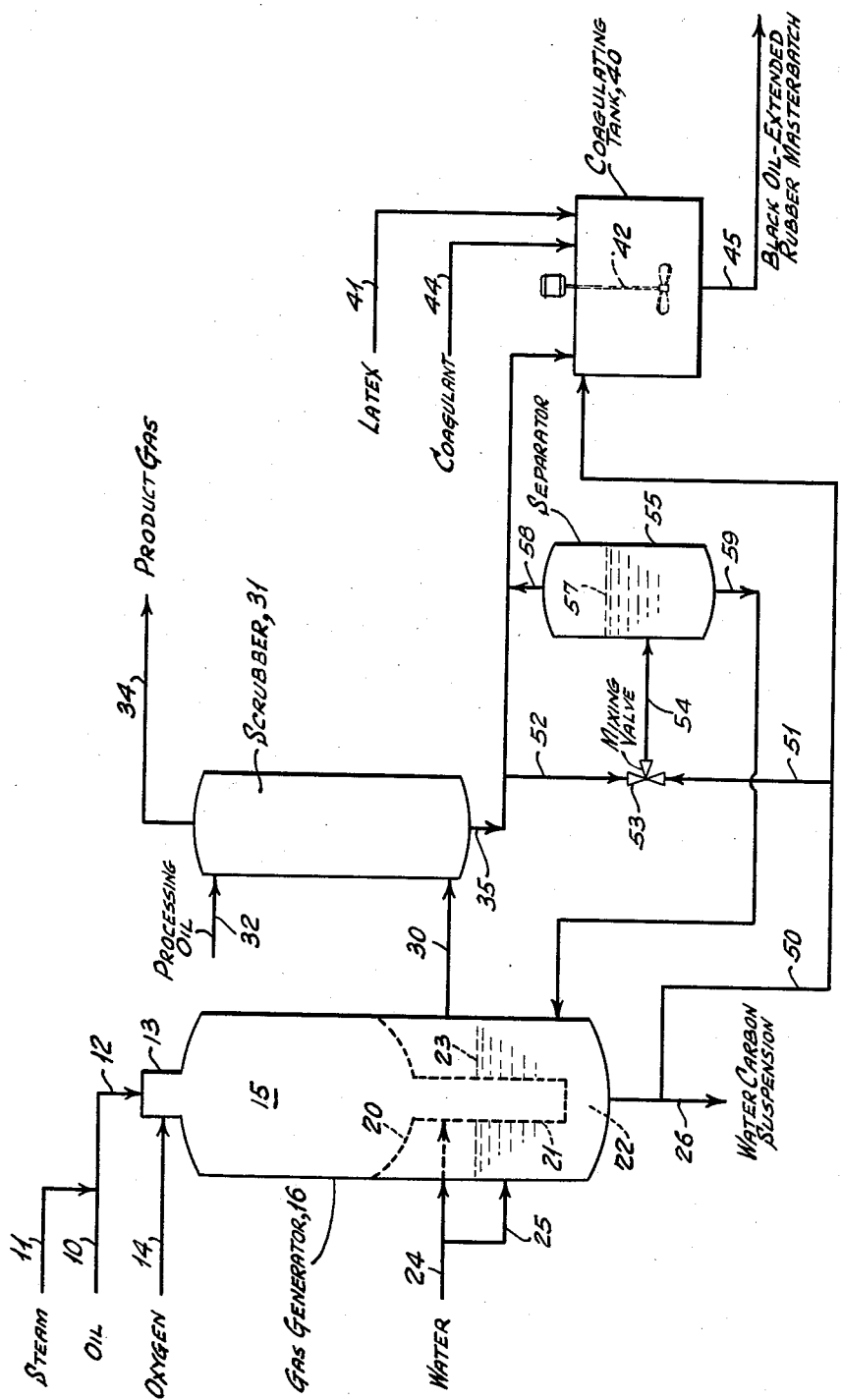

This invention relates to a process for the production of dispersions of carbon black in oil-extended rubber. In one of its more specific aspects, it is directed to a method of producing carbon black concomitantly with carbon monoxide and hydrogen in a partial oxidation process and incorporating said carbon black and an extender oil in rubber by a masterbatching process. In accordance with the process of this invention, a hydrocarbon oil is reacted with oxygen and steam in relative proportions such that carbon monoxide and hydrogen are the principal gaseous products. Carbon black is concomitantly produced and appears as entrained solids in the gaseous products. The entrained carbon black is separated from the gaseous products by contacting with a scrubbing liquid forming a suspension of carbon black in liquid. At least a portion of the separated carbon black is suspended in a rubber processing oil forming a slurry of carbon black in rubber processing oil, and said slurry is admixed with latex. The latex is then coagulated forming a rubber crumb comprising a dispersion of carbon black in oil extended rubber.

The generation of carbon monoxide and hydrogen by the partial oxidation of hydrocarbon liquids is a highly economic method of producing these gases. In the partial oxidation process a hydrocarbon liquid, for example crude oil, topped crude oil, distilliates, cracked residues and other liquid petroleum fractions, is reacted with an oxygen containing gas and steam in a closed compact reaction zone at an autogenous temperature within the range of about 1800 to 3500° F. preferably within the range of about 2200 to 2800° F. Preheating the reactants is generally desirable. The reaction zone is free from packing and catalyst and has nearly minimum internal surface. The reaction zone is maintained at a pressure above about 100 pounds per square inch gauge and may be as high as about 600 pounds per square inch gauge. Steam may be introduced into the reaction zone to assist in the dispersion of the fuel into the reactor, to assist in control of the reaction temperature, and as a reactant to increase the relative amount of hydrogen produced. The product consists essentially of carbon monoxide and hydrogen and contains relatively small amounts of water vapor, carbon dioxide, and entrained carbonaceous solid. The carbonaceous solid is in the form of a carbon black of unusual properties which is useful in rubber processing.

In the partial oxidation of liquid hydrocarbons for the concomitant production of carbon monoxide, hydrogen, and carbon black, the amount of uncombined oxygen supplied to the reaction zone is limited so that near maximum yields of carbon monoxide and hydrogen are obtained while liberating about 0.5 to 10.0 percent of the carbon contained in the hydrocarbon feed as carbon black. Air, oxygen-enriched air or substantially pure oxygen may be employed in the process. Oxygen of high purity may be readily obtained by the rectification of air. Commercial oxygen plants, capable of delivering large amounts of high purity oxygen, typically produce oxygen streams containing in excess of 95 mol percent oxygen, and oxygen of this purity is generally preferred.

Product gases issuing from the gas generation step contain a large amount of sensible heat. This heat may be employed to convert water to steam. For example, if the synthesis gas is to be passed to a process requiring additional steam, for example, a water gas shift process, steam may be generated by introducing water directly into the effluent gases from the gas generator. Where steam admixed with the synthesis gas stream is not desired, heat may be recovered from the gas generator effluent by passing the gases through heat exchangers or waste heat boilers. Steam for process or power use is advantageously produced in such waste heat boilers. Preheating of process streams, for example, fuel to the gas generation step, may be effected in heat exchangers. When the product gases are cooled by indirect heat exchange, it is preferred to cool the gases only to a temperature above the dew point at the prevailing pressure to avoid fouling of heat transfer surfaces occasioned by condensation of water and adhesion of entrained carbon.

The entrained carbon black is effectively removed from the product gases by contact with a scrubbing liquid. Water, liquid hydrocarbon, or a mixture of water and liquid hydrocarbon, may be employed as scrubbing liquid. When water is used as scrubbing liquid, the solids content of the water in the scrubbing zone is desirably maintained within the range of about 0.1 to about 2 percent solids and preferably about 1 percent solids for satisfactory pumpability. Hydrocarbons form pumpable suspensions with substantially larger proportions of this carbon black. For example, rubber processing oils will suspend up to about 15 weight percent carbon and remain sufficiently fluid to pass through pumps and lines without difficulty. It is preferred to maintain the carbon black content of oil slurries within the range of about 5 to 10 weight percent.

Oil masterbatching is widely used for extending rubber. In oil masterbatching, an oil, referred to as a rubber processing oil or an extender oil, is emulsified in water with a soap. The emulsion is mixed with rubber latex. The latex is then coagulated by adding a coagulant, for example, an acid-salt solution. Upon coagulation, the latex and oil emulsions are destroyed simultaneously forming a homogeneous composition of oil and rubber. The oil-extended rubber responds to processing, compounding, and curing operations similarly to pure rubber hydrocarbon.

Carbon black may be incorporated in rubber by a masterbatching technique wherein a dispertion of carbon black in water is admixed with latex before coagulation. In accordance with this invention, carbon black is incorporated in an oil-extended rubber by forming a slurry of carbon black in oil and coagulating latex in the presence of said slurry. The oil-carbon black slurry is advantageously formed by scrubbing the carbon black containing products of the partial oxidation of a liquid hydrocarbon with a rubber processing oil or by scrubbing the gaseous products with water and then contacting the carbon-water dispersion with a rubber processing oil.

In accordance with one embodiment of this invention, the hot effluent from the partial oxidation reaction zone is discharged through a dip leg opening below the surface of water in a quench pot. This not only quenches the hot products to the liquid-vapor equilibrium temperature of water at the prevailing conditions but effects separation of about 80 to 90 percent of the entrained carbon black from the gaseous products. The cooled product gases of reduced carbon content are scrubbed with oil in a gas-liquid contact apparatus, for example, a spray tower, bubble tower, baffle tower or packed tower, effecting separation of the remaining entrained carbon black and formation of a slurry of carbon black in oil. This slurry of carbon black in oil may be coagulated with latex to form a black, oil extended, rubber masterbatch. Alternatively, the carbon black containing gas from the gas generator may be scrubbed with water forming a suspension of about 1.0 percent carbon black in water and the carbon black then transferred to an oil slurry. The carbon-water suspension is contacted with about one tenth its weight of oil effecting transfer of the carbon to a slurry of carbon in oil having about ten times the carbon black concentration of the carbon-water suspension.

The scrubbing tower may be loaded by recycling a portion of the scrubbing liquid and dispersed solids directly from the bottom to the top of the scrubbing tower to effect efficient washing. The temperature of the scrubbing zone is advantageously maintained at a high temperature to facilitate succeeding process steps. The scrubbing temperature, of course, can be no higher than the vapor-liquid equilibrium temperature of the scrubbing medium at the prevailing pressure and may be substantially below the boiling point of the scrubbing liquid to avoid loss by vaporization. It is desirable to operate the scrubber at a high pressure, advantageously at substantially the pressure of the gas generation zone with allowance for pressure drop through lines and heat transfer equipment. The use of high pressures makes possible the use of relatively high temperatures in the scrubbing zone, effects advantages in succeeding processing steps, and delivers the product gas for use with a minimum requirement of additional compression.

An advantage of the process of this invention is that scrubbing liquids employed in separating entrained carbon from partial oxidation products are utilized in masterbatching to effect incorporation of both recovered carbon black and processing oil in black, masterbatched, oil extended, rubber.

Another advantage of the process is that a black masterbatched rubber of high electrical conductivity is produced.

The accompanying drawing illustrates one form of the process of this invention. Although the drawing illustrates one arrangement of apparatus in which the process of this invention may be practiced, it is not intended to limit the invention to the particular apparatus or materials described.

Oil in line 10 and steam in line 11 are combined in line 12 and passed to burner 13. Oxygen in line 14 is introduced with the steam-oil mixture into burner 13 in gas generator 16. Gas generator 16 comprises a burner 13 through which reactants are introduced into an unpacked refractory lined reaction zone 15. The lower wall 20 of the reaction zone opens into dip leg 21. Dip leg 21 discharges into quench pot 22 which contains a body of water having a level 23. The steam, oil, and oxygen react in reaction zone 15 at an autogenous temperature within the range of about 1800 to 3500° F. producing carbon monoxide, hydrogen and entrained carbonaceous solid. Hot products from reaction zone 15 discharge through dip leg 21 below water level 23 in quench pot 22. Water is introduced through line 24 into dip leg 21 as quench and through line 25 into quench pot 22. In bubbling through the water, the hot reaction zone effluent is cooled and about 90 percent of the entrained carbon black is separated forming a suspension of carbon black in water. Water-carbon suspension is discharged through line 26 for recovery of the carbon black by conventional means, for example filtration or oil displacement, not shown.

Gaseous products containing remaining entrained carbon black are passed through line 30 to scrubber 31 wherein the gas is contacted in countercurrent flow with rubber processing oil introduced through line 32. Scrubbed gases substantially free of carbon are discharged through line 34. A slurry of carbon black in oil is withdrawn through line 35 and discharged to coagulating tank 40.

Latex is added to coagulating tank 40 through line 41 and the latex and oil-carbon slurry are intimately mixed by agitator 42. Coagulant, for example, an acid-salt solution, is introduced through line 44 causing the latex-oil-carbon suspension to coagulate into a rubber crumb incorporating the oil and carbon. Black, oil-extended, rubber masterbatch is discharged through line 45.

If desired, carbon black in excess of that which may be suspended in the processing oil may be incorporated in the black, oil-extended masterbatch by mixing additional carbon black as a suspension in water with the latex and oil-carbon slurry before coagulation. Advantageously, the carbon black-water suspension in line 26 may be passed through line 50 to coagulating tank 40 to provide additional carbon black in the masterbatch.

In a method of operation in which a portion of the carbon black in the water suspension is transferred to the oil-carbon slurry, water-carbon suspension from line 50 is passed through line 51 to mixing valve 53 where it is intimately mixed with oil-carbon slurry from lines 35 and 52. The mixture of oil, carbon and water is passed from mixing valve 53 through line 54 to separator 55. Oil-carbon slurry of increased carbon content floats on the surface of clarified water with interface 57 in separator 55. The oil-carbon slurry of increased carbon content is discharged through lines 58 and 35 to coagulating tank 40. Clarified water is discharged through line 59 and returned to quench pot 22 to provide a part of the water required therein.

*Example*

Carbon monoxide, hydrogen and carbon black are produced by the partial oxidation of a bunker fuel oil having the following tests:

| | |
|---|---|
| Gravity, ° API | 9 |
| Furol viscosity, seconds, @ 122° F. | 150 |
| Flash point, ° F. | 285 |
| Gross heating value, B.t.u. per pound | 18,200 |

Oxygen of 99.9 percent purity at a rate of 5258 standard cubic feet per hour and a mixture of 441.9 pounds per hour of bunker fuel oil and 260.6 pounds per hour of steam preheated to a temperature of 722° F. are introduced into a gas generation zone operated at 345 pounds per square inch pressure. The oxygen, oil and steam react at an autogenous temperature of 2540° F. to produce 22,182 standard cubic feet per hour (dry basis) of product gas of the following composition (mol percent):

| | |
|---|---|
| Hydrogen | 46.9 |
| Carbon monoxide | 47.0 |
| Carbon dioxide | 5.2 |
| Nitrogen | 0.3 |
| Methane | 0.4 |
| Hydrogen sulfide and carbonyl sulfide | 0.2 |

In addition, 4.1 weight percent of the carbon in the feed is liberated as carbon black entrained in the gaseous reaction products. A sample of dried carbon black separated from the reaction products has the following characteristics:

| | |
|---|---|
| Ash, weight percent | 0.42 |
| Oil absorption, ASTM Test D-281-31 (gals. per hundred pounds) | 26.8 |
| pH | 3.6 |
| Conductivity, mohs per inch cube | 25 |
| Color (ABC Standard) | 170 |

Effluent from the gas generation zone is passed through a dip leg into a quench pot in the bottom of the generator where it is bubbled through water. This water cools the products to a temperature of about 400° F. and separates about 85 percent of the entrained carbon from the gases forming a slurry of carbon in water. Carbon-water slurry at a rate of 161 gallons per hour containing 13.45 pounds per hour of carbon black is withdrawn for further processing as described hereinafter.

Gases after bubbling through the quench pot are discharged to a scrubbing zone where they are contacted in countercurrent flow with a naphthenic rubber processing oil for removal of the remaining entrained carbon black. Product gas, free of entrained carbon black is discharged from the top of the oil scrubber. A slurry of carbon black in rubber processing oil comprising 21.1 pounds per hour of oil and 2.34 pounds per hour of carbon black is withdrawn from the scrubbing zone.

The oil-carbon black from the scrubbing zone, the water-carbon slurry from the quench pot and synthetic rubber latex containing 42.2 pounds per hour of rubber hydrocarbon are mixed in a coagulating tank to form a uniform mixture. An acid coagulant is added to the mixture forming a rubber crumb which separates from an aqueous serum. The rubber crumb is separated, washed and dried producing 79.1 pounds of black, oil-extended, rubber having a recipe of 100 parts rubber hydrocarbon, 50 parts of processing oil hydrocarbon and 37.5 parts of carbon black (25 parts carbon black per 100 parts of total hydrocarbon). The black rubber produced is highly conductive and is useful in the manufacture of electrically conductive rubber goods.

Obviously, many modifications and variations of the invention as hereinbefore set forth may be made without departing from the spirit and scope thereof, and therefore only such limitations should be imposed as are indicated in the appended claims.

I claim:

1. A process for the production of a dispersion of carbon black in oil extended rubber which comprises effecting reaction between a liquid hydrocarbon, steam and oxygen at an autogenous temperature within the range of about 1800 to 3500° F. in relative proportions such that carbon monoxide and hydrogen are the principal gaseous products and at least 0.5 percent and not more than 10.0 percent of the carbon contained in said hydrocarbon is liberated as a carbon black by product entrained in said gaseous products, contacting said gaseous products and entrained carbon black with a rubber processing oil and forming a slurry consisting essentially of carbon black in oil, admixing said slurry with liquid rubber latex, and coagulating said latex forming a rubber crumb comprising a dispersion of said carbon black in oil extended rubber.

2. A process for the production of a dispersion of carbon black in oil extended rubber which comprises effecting reaction between a liquid hydrocarbon, steam and oxygen at an autogenous temperature within the range of about 1800 to 3500° F. in relative proportions such that carbon monoxide and hydrogen are the principal gaseous products and at least 0.5 percent and not more than 10.0 percent of the carbon contained in said hydrocarbon is liberated as a carbon black by product, contacting said gaseous products and entrained carbon with water effecting separation of a major portion of said carbon black from said gaseous products and forming a suspension of carbon black in water, contacting gaseous products containing remaining entrained carbon black with a rubber processing oil effecting removal of remaining entrained carbon black from said gaseous products and forming a slurry consisting essentially of carbon black in oil, mixing said slurry with liquid rubber latex, and coagulating said latex in admixture with said slurry by adding a coagulating agent thereto forming a rubber crumb comprising a dispersion of said carbon black in oil extended rubber.

3. A process for the production of dispersions of carbon black in oil extended rubber which comprises effecting reaction between a liquid hydrocarbon, steam and oxygen at an autogenous temperature within the range of about 1800 to 3500° F. in relative proportions such that carbon monoxide and hydrogen are the principal gaseous products and at least 0.5 percent and not more than 10.0 percent of the carbon contained in said hydrocarbon is liberated as a carbon black by product entrained in said gaseous products, contacting said gaseous products and entrained carbon black with water in a gas scrubbing zone effecting removal of said carbon black from said gaseous products and forming a suspension of said carbon black in water, contacting said suspension with a rubber processing oil effecting transfer of said carbon black from said suspension to said oil and forming a slurry consisting essentially of said carbon black in oil, mixing said slurry with liquid rubber latex, and coagulating said latex in admixture with said slurry by adding a coagulating agent thereto forming a rubber crumb comprising a dispersion of said carbon black in oil extended rubber.

4. A process in accordance with claim 2, also comprising, before mixing said slurry with liquid rubber latex, increasing the concentration of carbon in said slurry by mixing said slurry with said suspension of carbon black in water thereby effecting transfer of carbon from said suspension to said slurry.

5. A process in accordance with claim 4, also comprising, after effecting transfer of carbon from said suspension to said slurry, recycling the resulting water of reduced carbon content into contact with said gaseous products to separate more carbon therefrom.

References Cited in the file of this patent

UNITED STATES PATENTS

| | | |
|---|---|---|
| 2,585,659 | Kilpatrick | Feb. 12, 1952 |
| 2,719,135 | Wood | Sept. 27, 1955 |
| 2,769,795 | Braendle | Nov. 6, 1956 |
| 2,943,064 | Lipkin | June 28, 1960 |
| 2,955,097 | White | Oct. 4, 1960 |

FOREIGN PATENTS

| | | |
|---|---|---|
| 803,993 | Great Britain | Nov. 5, 1958 |